(12) United States Patent
Kodama et al.

(10) Patent No.: US 8,579,592 B2
(45) Date of Patent: Nov. 12, 2013

(54) TURBOFAN ENGINE

(75) Inventors: Hidekazu Kodama, Tokyo (JP); Shinya Goto, Tokyo (JP); Ikuhisa Mizuta, Tokyo (JP); Takeshi Murooka, Tokyo (JP)

(73) Assignee: IHI Corporation, Tokyo (JP)

( * ) Notice: Subject to any disclaimer, the term of this patent is extended or adjusted under 35 U.S.C. 154(b) by 896 days.

(21) Appl. No.: 12/307,535

(22) PCT Filed: Apr. 6, 2007

(86) PCT No.: PCT/JP2007/057744
§ 371 (c)(1),
(2), (4) Date: Jan. 5, 2009

(87) PCT Pub. No.: WO2008/004364
PCT Pub. Date: Jan. 10, 2008

(65) Prior Publication Data
US 2009/0304518 A1 Dec. 10, 2009

(30) Foreign Application Priority Data

Jul. 4, 2006 (JP) .................................. 2006-184207

(51) Int. Cl.
*B23K 5/08* (2006.01)
(52) U.S. Cl.
USPC .................... 416/229 R; 416/230; 416/241 R
(58) Field of Classification Search
USPC ...................... 416/229 R, 239, 241
See application file for complete search history.

(56) References Cited

U.S. PATENT DOCUMENTS

| 1,779,186 | A | 10/1930 | Pavlecka |
| 2,398,203 | A | 4/1946 | Browne |
| 2,936,948 | A | 5/1960 | Eck |
| 3,075,743 | A | 1/1963 | Sheets |
| 3,734,649 | A | 5/1973 | Sandy |
| 3,794,444 | A | 2/1974 | Campbell et al. |
| 4,183,719 | A | 1/1980 | Bozung |
| 4,257,743 | A | 3/1981 | Fujii |
| 4,595,340 | A | 6/1986 | Klassen et al. |

(Continued)

FOREIGN PATENT DOCUMENTS

| JP | 48-2660 | 1/1973 |
| JP | 4-1637 | 1/1992 |

(Continued)

OTHER PUBLICATIONS

International Search Report issued in corresponding application No. PCT/JP2007/057744, completed May 9, 2007 and mailed May 22, 2007.

(Continued)

*Primary Examiner* — Michael Lebentritt
(74) *Attorney, Agent, or Firm* — Griffin & Szipl, P.C.

(57) ABSTRACT

A hub-side leading edge part of a fan first-stage rotating blade 10 for taking an air thereinto more extends in a forward direction of an engine than a tip-side leading edge part and a mid-span leading edge part. The hub side of the fan first-stage rotating blade 10 is integrally connected as one with the tip side and the mid span while having a longer chord length than those of the tip side and the mid span. A radius at a root of the hub-side leading edge part is set in a boss ratio of 0 to 0.4.

4 Claims, 6 Drawing Sheets

(56) References Cited

U.S. PATENT DOCUMENTS

| | | |
|---|---|---|
| 5,403,165 A | 4/1995 | Lehe et al. |
| 5,443,365 A | 8/1995 | Ingling et al. |
| 6,145,300 A | 11/2000 | Romani |
| 6,398,499 B1 | 6/2002 | Simonetti et al. |
| 6,722,847 B2 | 4/2004 | Freeman et al. |
| 6,935,840 B2 | 8/2005 | Romani et al. |
| 2002/0194834 A1 | 12/2002 | Springer |
| 2006/0059887 A1 | 3/2006 | Klingels et al. |
| 2007/0217914 A1* | 9/2007 | Fujimura .................. 416/219 R |

FOREIGN PATENT DOCUMENTS

| | | |
|---|---|---|
| JP | 05-180194 | 7/1993 |
| JP | 8-189419 | 7/1996 |
| JP | 11-22486 | 1/1999 |
| JP | 2001-271792 | 10/2001 |
| JP | 2004-027845 | 1/2004 |
| JP | 2004-027854 | 1/2004 |
| JP | 2004027854 A * | 1/2004 |
| JP | 2004-137950 | 5/2004 |
| JP | 2005-315138 | 11/2005 |
| JP | 2005315138 A * | 11/2005 |

OTHER PUBLICATIONS

Notice of Allowance issued in corresponding U.S. Appl. No. 11/427,107 dated Nov. 16, 2009.

Office Action issued in related co-pending U.S. Appl. No. 11/568,141, mailed May 5, 2009.

Office Action issued in Canadian Patent Application No. 2,656,291, dated May 3, 2011.

Office Action issued in co-pending related U.S. Appl. No. 11/427,107, mailed Jun. 24, 2009.

Office Action issued in related co-pending U.S. Appl. No. 10/568,141, mailed Nov. 10, 2009.

Office Action issued in Canadian Patent Application No. 2,656,291, dated Aug. 20, 2010.

Office Action issued in related co-pending U.S. Appl. No. 11/568,141, mailed Nov. 10, 2009.

Certified translation of Japanese Unexamined Patent Application Publication No. 2005-315138, paragraph [0042] [Fig. 1] and [Fig. 2], translated on May 24, 2012.

* cited by examiner rotation direction rotation direction

A part rotation direction

Section C—C (tip)

Section D—D (mid)

Section E—E (hub)

rotation direction

Section F—F (tip)

Section G—G (mid)

Section H—H (hub)

TURBOFAN ENGINE

This is a National Phase Application in the United States of International Patent Application No. PCT/JP2007/057744 filed Apr. 6, 25007, which claims priority of Japanese Paten Application No. 184207/2006 filed Jul. 4, 2006. The entire disclosures of the above patent applications are hereby incorporated by reference.

BACKGROUND OF THE INVENTION

1. Technical Field of the Invention

The present invention relates to a turbofan engine.

2. Description of Related Art

A turbojet engine of an aircraft having a bypass flow in the downstream of a fan for taking an air thereinto is called as "turbofan engine". A bypass ratio corresponds to a flow rate ratio (bypass flow/core flow) between an air flow (a core flow) flowing into a core engine (a compressor, a combustor, and a turbine) and a bypass flow bypassing them. There is obtained an effect of reducing a flow speed of an exhaust jet and lowering a noise and a specific fuel consumption, in accordance with an increase of the ratio.

However, in the above-described turbofan engine, a problem arises in that a fan first-stage rotating blade (an up-front fan) and an inner diameter of a casing surrounding the fan first-stage rotating blade are enlarged by enlarging the bypass ratio, and a weight of the engine is increased.

In order to solve this problem, the inventors of the invention have proposed and filed a turbofan engine disclosed in Patent Document 1.

As shown in FIG. 1, the turbofan engine of Patent Document 1 is provided with a fan first-stage rotating blade 72 for taking an air thereinto and a spinner 74 for rotationally driving the fan first-stage rotating blade, in which the spinner includes a spiral blade 76 extending from an axis in a spiral shape in an outer-radial direction so as to suck an air from a front surface of the spinner and supply the air to the fan first-stage rotating blade.

[Patent Document 1]

Japanese Patent Application Laid-Open No. 2004-27854, "Turbofan Engine"

As described above, in the above-described turbofan engine, a problem arises in that the fan first-stage rotating blade (an up-front fan) and an inner diameter of a casing surrounding the fan first-stage rotating blade are enlarged by enlarging the bypass ratio, and a weight of the engine is increased.

In other words, as the fan first-stage rotating blade embedded into the spinner of the turbofan engine has an embedded structure, a certain degree of hub/tip ratio (inlet hub diameter/inlet tip diameter) is necessary, and an area of a fan inlet is narrowed as much as an area of the spinner.

Therefore, if it is intended to increase the bypass ratio for realizing a decrease in fuel consumption and noise, it is necessary to further widen the diameter of the fan and the inner diameter of the casing, so that the weight of the engine is increased.

SUMMARY OF THE INVENTION

The present invention is contrived to solve the above-described problems. That is, the invention further improves the turbofan engine of Patent Document 1, and an object of the invention is to provide a turbofan engine capable of increasing an intake air flow rate of a fan first-stage rotating blade without enlarging a diameter of the fan rotating blade and an inner diameter of a casing, and of realizing a decrease in weight as well as a decrease in fuel consumption and noise by increasing a bypass ratio.

According to the invention, there is provided a turbofan engine including: a fan first-stage rotating blade which takes an air thereinto and has a hub-side leading edge part more extending in a forward direction of the engine than a tip-side leading edge part and a mid-span leading edge part.

According to a preferred embodiment of the invention, the hub side of the fan first-stage rotating blade is integrally connected as one with the tip side and the mid span while having a longer chord length than those of the tip side and the mid span.

Also, a radius at a root of the hub-side leading edge part is set in a boss ratio of 0 to 0.4.

Also, the leading edge parts are formed toward a downstream side of the engine from the hub side to an outer-diameter side while having a short chord length so as to be smoothly connected to each other in a general fan blade shape at a radial position in a span of 5 to 50% of a trailing edge part.

Also, the hub-side leading edge part is formed into a substantially linear basic shape or is formed into a convex shape or a concave shape in an outer-radial direction.

Also, the fan first-stage rotating blade is formed into a shape in which two or a plurality of blades are integrally connected as one with each other by a chemical process or a structural process.

With the above-described configuration according to the invention, since the hub side of the fan first-stage rotating blade more extends in a forward direction of the engine, it is possible to increase the flow rate flowing to the hub side in front of the engine. Accordingly, it is possible to realize the same total flow rate by using the fan rotating blade having a smaller diameter than that of the fan rotating blade according to the conventional art.

Additionally, it is possible to increase a hub-side pressure ratio even when a hub-side speed triangle has a smaller turning angle than that of the fan rotating blade according to the conventional art. The turning angle indicates a difference between relative flow angles in an inlet and an outlet.

Then, since a hub-side blade sectional area increases, rigidity increases and soundness is ensured even when a bird is sucked to be caught therein.

Accordingly, in a turbofan engine having a large bypass ratio, it is possible to increase an air flow rate of the fan first-stage rotating blade without enlarging a diameter of the fan first-stage rotating blade and a diameter of a casing surrounding the fan first-stage rotating blade. Therefore, it is possible to realize a decrease in weight as well as a decrease in fuel consumption and noise by increasing the bypass ratio.

Also, it is possible to more increase the hub-side pressure ratio than that of the fan rotating blade according to the conventional art.

DESCRIPTION OF THE PREFERRED EMBODIMENTS

Figure 1:
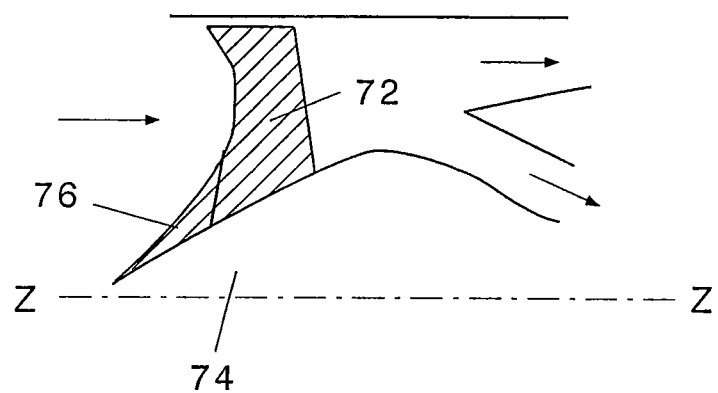
FIG. 1 is a configuration diagram showing a turbofan engine of Patent Document 1.

Hereinafter, a preferred embodiment of the invention will be described with reference to the drawings. Also, in the respective drawings, the same reference numerals are given to the same components, and the repetitive description thereof will be omitted.

Figure 2A:
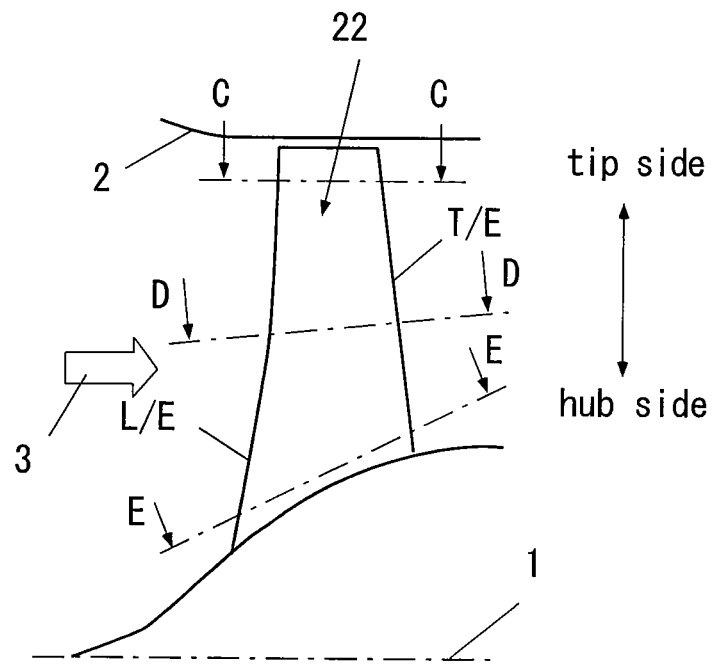
FIG. 2A is a configuration diagram showing a turbofan engine according to the conventional art.
Figure 2B:
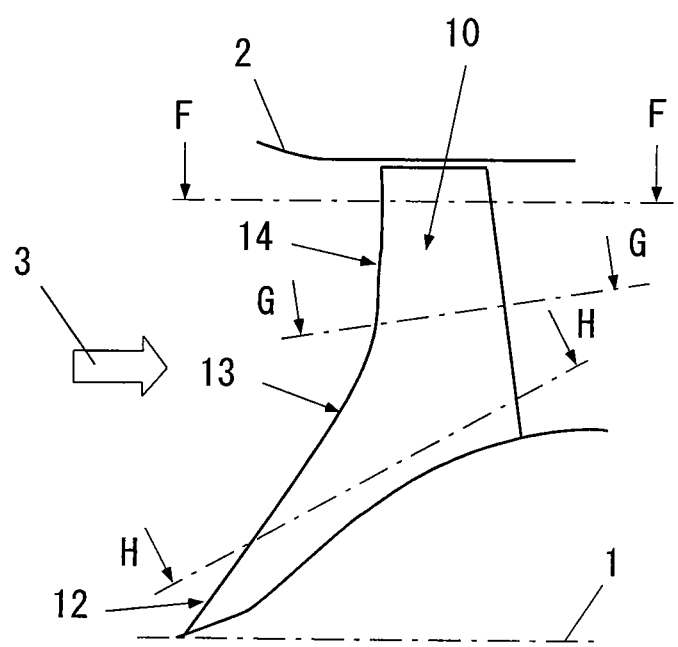
FIG. 2B is a configuration diagram showing a turbofan engine according to the invention.

FIG. 2A is a configuration diagram showing a turbofan engine according to the conventional art, and FIG. 2B is a configuration diagram showing a turbofan engine according to the invention. In the respective drawings, Reference numeral 1 denotes an engine rotary shaft, Reference numeral 2 denotes a casing inner diameter, and Reference numeral 3 denotes a flow of an inflow air.

As shown in FIG. 2A, in a fan first-stage rotating blade 22 according to the conventional art, a leading edge part (L/E) and a trailing edge part (T/E) are formed into a linear surface or a substantially linear curve surface.

On the contrary, as shown in FIG. 2B, in the turbofan engine according to the invention, a hub-side leading edge part 12 of a fan first-stage rotating blade 10 for taking an air thereinto more extends in a forward direction than a tip-side leading edge part 14 and a mid-span leading edge part 13.

Figure 3A:
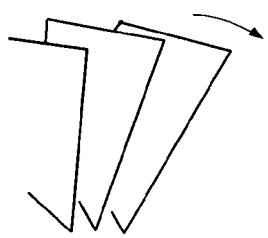
FIG. 3A is a schematic perspective diagram showing a fan first-stage rotating blade according to the conventional art.
Figure 3B:
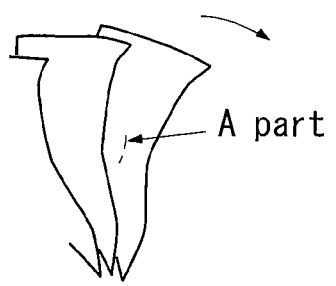
FIG. 3B is a schematic perspective diagram showing a fan first-stage rotating blade according to the invention.
Figure 3C:
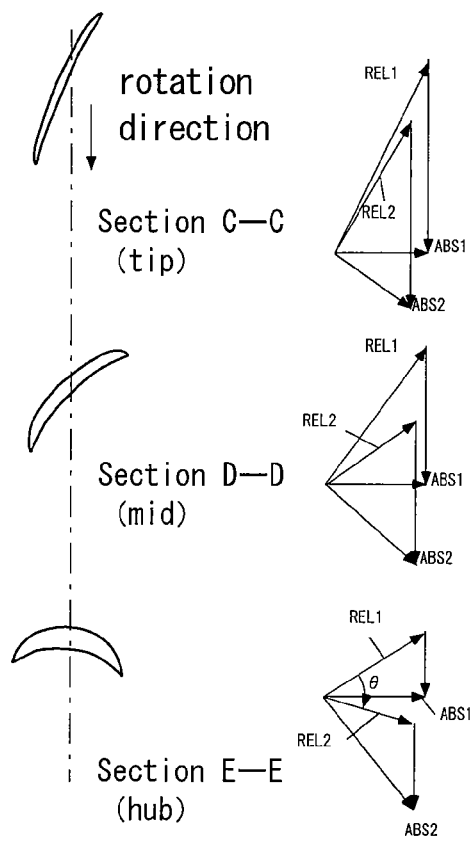
FIG. 3C shows a speed triangle of three cross sections (hub, mid, and tip) and a blade sectional shape of a fan first-stage rotating blade according to the conventional art.
Figure 3D:
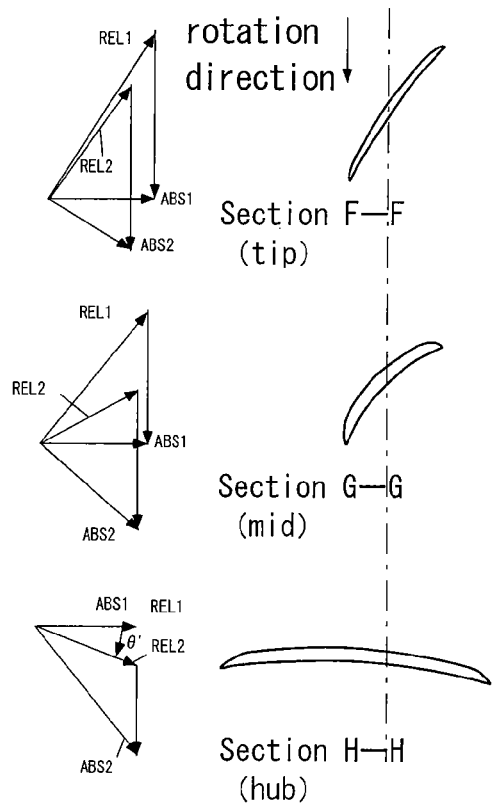
FIG. 3D shows a speed triangle of three cross sections (hub, mid, and tip) and a blade sectional shape of the fan first-stage rotating blade according to the invention.

FIGS. 3A to 3D are explanatory diagrams showing the fan first-stage rotating blade according to the conventional art and the fan first-stage rotating blade according to the invention, where FIG. 3A is a schematic perspective diagram showing the fan first-stage rotating blade 22 according to the conventional art, FIG. 3B is a schematic perspective diagram showing the fan first-stage rotating blade 10 according to the invention, FIG. 3C shows a speed triangle of three cross sections (hub, mid, and tip) and a blade sectional shape of the fan first-stage rotating blade according to the conventional art, and FIG. 3D shows a speed triangle of three cross sections (hub, mid, and tip) and a blade sectional shape of the fan first-stage rotating blade according to the invention. In the drawings, ABS1 and ABS2 denote absolute speeds of an inflow air and an outflow air, and REL1 and REL2 denote relative speeds of the inflow air and the outflow air.

As understood in FIGS. 3C and 3D, a difference appears in the hub-side speed triangle, and a turning angle θ' of the fan first-stage rotating blade according to the invention is apparently smaller than a turning angle θ of the fan first-stage rotating blade according to the conventional art. As shown in the section H-H of FIG. 3D, the blade shape is formed such that a chord length of a hub-side blade shape according to the invention is longer than that according to the conventional art and a turning angle thereof is smaller than that according to the conventional art. This is because the large turning angle is necessary for the fan first-stage rotating blade according to the conventional art to perform a work to a fluid due to a small difference between the hub-side diameters of an inflow part and an outflow part. However, in the fan first-stage rotating blade 10 according to the invention, since the hub-side leading edge part 12 is formed into a shape more extending in a forward direction of the engine than the tip-side leading edge part 14 and the mid-span leading edge part 13, a difference between the hub-side diameters of the inflow part and the outflow part is large, thereby requiring the small turning angle for performing the same work to the fluid.

Accordingly, it is understood that the invention requires smaller load acting on the blade than that of the conventional art and such a blade shape is easily achieved.

Figure 4A:
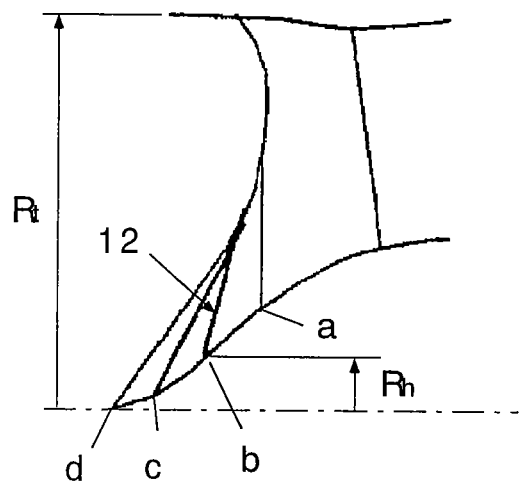
FIG. 4A is an explanatory diagram showing a boss ratio according to the invention.
Figure 4B:
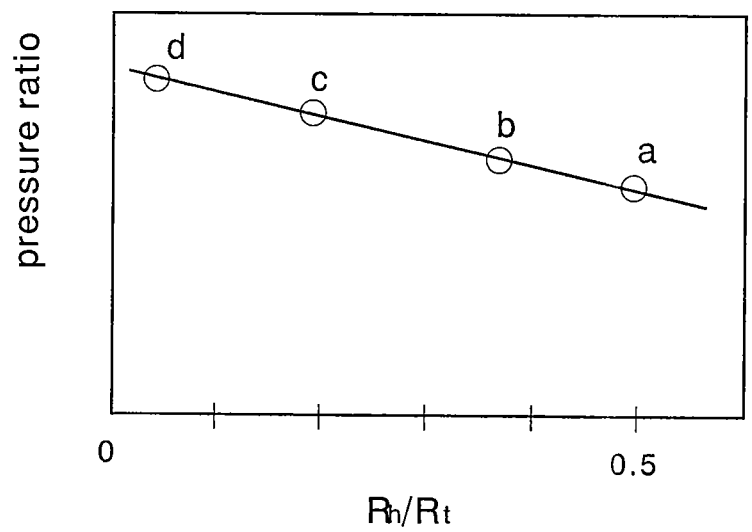
FIG. 4B is a diagram showing a relationship between a boss ratio and a pressure ratio according to the invention.

FIGS. 4A and 4B are explanatory diagrams showing the turbofan engine according to the invention. In these drawings, FIG. 4A is an explanatory diagram showing a boss ratio and FIG. 4B is a relationship diagram between a boss ratio and a pressure ratio.

The boss ratio indicates a ratio between a radius Rh at a root of the hub-side leading edge part and a radius Rt of the tip-side leading edge part (Rh/Rt).

Additionally, the pressure ratio indicates a pressure ratio of the fan first-stage rotating blade 10 in a longitudinal direction.

In this invention, it is desirable that the radius at the root of the hub-side leading edge part 12 is set in a boss ratio of 0 to 0.4. In FIG. 4A, a denotes an example of the hub-side leading edge part according to the conventional art and b, c, and d denote the positions according to the invention.

In FIG. 4B, a, b, c, and d correspond to the positions of FIG. 4A, respectively.

In FIG. 4B, it is possible to obtain the larger pressure ratio in the boss ratio of 0 to 0.4 than the boss ratio of 0.5 or more, and it is possible to increase the pressure ratio in the boss ratio of 0 to 0.4.

FIGS. 5A to 5D are more detailed configuration diagrams according to the invention.

Figure 5A:
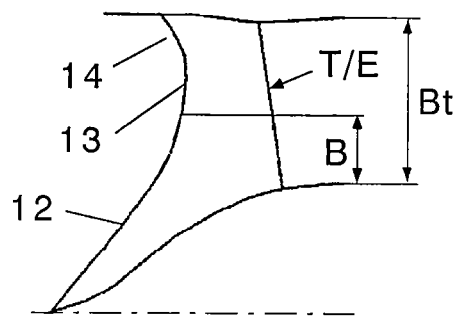
FIG. 5A is a more detailed configuration diagram of the invention.

As shown in FIG. 5A, the leading edge parts 12, 13, and 14 are formed toward the downstream side of the engine from the hub side to the outer-diameter side while having the short chord length so as to be smoothly connected to each other in a general fan blade shape at a radial position B in a span of 5 to 50% of the trailing edge part (T/E).

With such a configuration, it is possible to obtain high pressure ratio on the hub side with the smaller turning angle than that according to the conventional art and to obtain the same performance as that of the general fan blade in the tip-side leading edge part and the mid-span leading edge part.

Figure 5B:
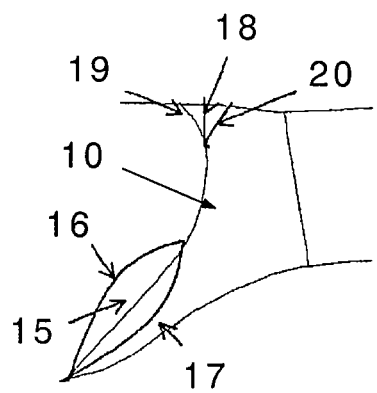
FIG. 5B is a more detailed another configuration diagram of the invention.

Additionally, as shown in FIG. 5B, it is desirable that the hub-side leading edge part 12 is formed into a substantially linear basic shape 15 or is formed into a convex shape 16 or a concave shape 17 in an outer-radial direction.

In terms of the convex shape 16, it is possible to increase the hub-side pressure ratio in a broad range (in a span of 0 to 50%).

In terms of the concave shape 17, it is possible to increase the hub-side pressure ratio in a span of 0 to 30% and to restrict a weight increase.

Additionally, the tip-side leading edge part 14 may be perpendicular 18 to an outer-diameter path, inclined forward 19, or inclined backward 20.

Figure 5C:
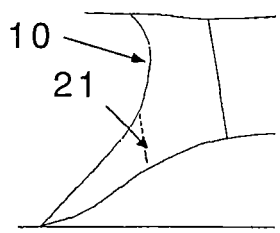
FIG. 5C is a more detailed another configuration diagram of the invention.
Figure 5D:
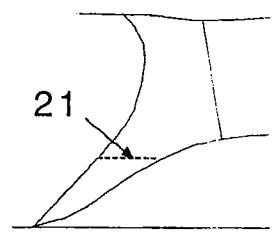
FIG. 5D is a more detailed another configuration diagram of the invention.

Then, as shown in FIG. 5C, the fan first-stage rotating blade 10 may not be formed into a complete single member, but may be formed into a shape in which two or a plurality of blades are integrally connected as one with each other in a desirably linear manner in terms of a chemical process or a structural process in a range perpendicular or horizontal to an engine center shaft as shown by Reference numeral 21 in the drawing.

Herein, the chemical process indicates diffusion bonding, welding, adhering, or the like. The structural process indicates fitting, bolt-fixing, or the like.

[First Embodiment]

Figure 6A:
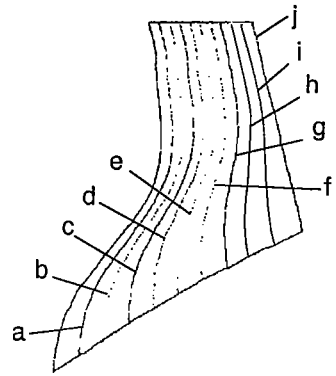
FIG. 6A is a diagram showing a constant pressure ratio line of the turbofan engine according to the invention.
Figure 6B:
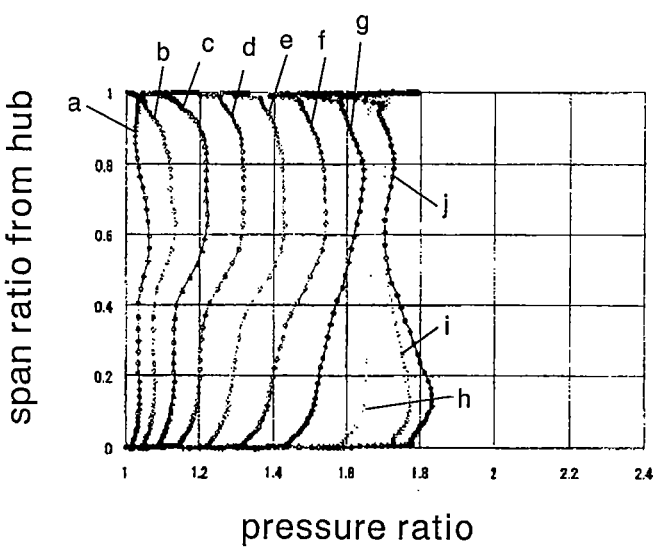
FIG. 6B is a diagram showing a pressure ratio distribution in a span direction of the turbofan engine according to the invention.
Figure 6C:
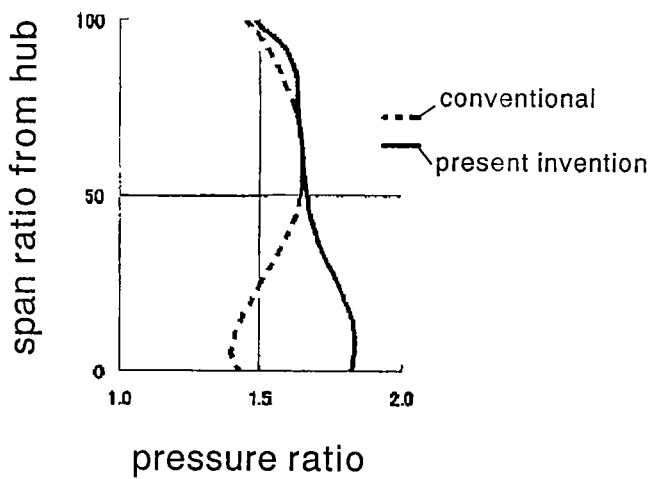
FIG. 6C is a diagram comparing the turbofan engine according to the invention with the turbofan engine according to the conventional art.

FIGS. 6A to 6C are diagrams showing an embodiment of the turbofan engine according to the invention. In these drawings, FIG. 6A shows a constant pressure ratio line, FIG. 6B shows a distribution of the pressure ratio in a span direction, and FIG. 6C shows a comparison with the conventional art. These are obtained by a simulation result (CFD calculation result) using a computer.

In FIG. 6A, a to j indicate the constant pressure ratio line from the leading edge part to the trailing edge part of the fan first-stage rotating blade according to the invention. From this drawing, it is understood that the pressure efficiently increases on the hub side of the fan first-stage rotating blade 10.

In FIG. 6B, a to j correspond to those of FIG. 6A. From this drawing, it is understood that the pressure ratio on the hub side of the fan first-stage rotating blade 10 is larger than those on the tip side and the mid span.

As shown in FIG. 6C, the CFD calculation result example shows that it is possible to more increase the hub-side pressure ratio by 10 to 20% or so and to more increase a flow rate by 10% or so for each sectional area than the fan rotating blade according to the conventional art having the same fan diameter.

As described above, with the configuration according to the invention, since the hub-side leading edge part of the fan first-stage rotating blade 10 more extends in a forward direction of the engine, it is possible to increase the flow rate flowing to the hub side in front of the engine. Accordingly, it is possible to realize the same total flow rate by using the fan rotating blade having a smaller diameter than that of the fan rotating blade according to the conventional art.

Additionally, it is possible to increase the hub-side pressure ratio even when the hub-side speed triangle has a smaller turning angle than that of the fan rotating blade according to the conventional art.

Then, since the hub-side blade sectional area increases, rigidity increases and soundness is ensured even when a bird is sucked to be caught therein.

Accordingly, in a turbofan engine having a large bypass ratio, it is possible to increase an air flow rate of the fan first-stage rotating blade without enlarging a diameter of the fan first-stage rotating blade and a diameter of a casing surrounding the fan first-stage rotating blade. Therefore, it is possible to realize a decrease in weight as well as a decrease in fuel consumption and noise by increasing the bypass ratio.

Also, it is possible to increase the hub-side pressure ratio by using the fan rotating blade having the smaller turning angle than that of the fan rotating blade according to the conventional art.

Additionally, the invention is not limited to the above-described embodiment, but may be, of course, modified into various forms without departing from the spirit of the invention.

The invention claimed is:

1. A turbofan engine comprising:
   a fan first-stage rotating blade which takes air thereinto and has a hub-side leading edge part extending further in a forward direction of the engine than a tip-side leading edge part and a mid-span leading edge part,
   wherein a radius at a root of the hub-side leading edge part is set in a boss ratio of 0 to 0.4, and
   wherein the hub-side leading edge part is formed into a convex shape in a span of 0 to 50% and is formed into a linear or a substantially concave shape for the remainder of the span in an outer-radial direction.

2. The turbofan engine according to claim 1, wherein the hub side leading edge part of the fan first-stage rotating blade is integrally connected as one with the tip side leading edge part and the mid span leading edge part while having a chord length longer than the combined chord lengths of the tip side leading edge part and the mid span leading edge part.

3. The turbofan engine according to claim 1, wherein the hub side leading edge part, the tip side leading edge part and the mid span leading edge part are formed toward a downstream side of the engine from the hub side to an outer-diameter side, the hub side leading edge part, the tip side leading edge part and the mid span leading edge part merging smoothly with one another to have a smooth continuously curved fan blade shape, and wherein the hub side leading edge part has a chord length such that the hub side leading edge part merges with the mid span leading edge part at a radial position in a span of 5 to 50% of a trailing edge part.

4. The turbofan engine according to claim 1, wherein the fan first-stage rotating blade is formed into a shape in which two or a plurality of blades are rigidly connected as one with each other by a chemical process.

* * * * *